Sept. 6, 1966 R. FOWLER ETAL 3,270,999
SEGMENTED CORE FOR MOLDING A CAVITY IN A CAST SOLID PROPELLANT
ROCKET MOTOR
Filed April 12, 1963 3 Sheets-Sheet 1

RUSSELL FOWLER
JAMES L. BULFER  INVENTORS
LOUIS L. ULLMAN

BY

*Roth D Williams Jr*  ATTORNEY

Sept. 6, 1966 R. FOWLER ETAL 3,270,999
SEGMENTED CORE FOR MOLDING A CAVITY IN A CAST SOLID PROPELLANT
ROCKET MOTOR
Filed April 12, 1963 3 Sheets-Sheet 2

RUSSELL FOWLER
JAMES L BULFER   INVENTORS
LOUIS L. ULLMAN

BY

ATTORNEY

Sept. 6, 1966  R. FOWLER ETAL  3,270,999
SEGMENTED CORE FOR MOLDING A CAVITY IN A CAST SOLID PROPELLANT ROCKET MOTOR
Filed April 12, 1963  3 Sheets-Sheet 3

RUSSELL FOWLER
JAMES L BULFER  INVENTORS
LOUIS L. ULLMAN

BY

*[signature]* ATTORNEY

United States Patent Office 3,270,999
Patented Sept. 6, 1966

3,270,999
SEGMENTED CORE FOR MOLDING A CAVITY IN A CAST SOLID PROPELLANT ROCKET MOTOR
Russell Fowler, James L. Bulfer, and Louis L. Ullman, Huntsville, Ala., assignors to Thiokol Chemical Corporation, Bristol, Pa., a corporation of Delaware
Filed Apr. 12, 1963, Ser. No. 272,771
2 Claims. (Cl. 249—61)

This invention relates to improvements in segmented cores and more particularly to segmented cores that are to be used in loading solid propellant rocket motors.

Since the present trend in solid propellant rocketry is toward larger solid propellant rocket motors, and since such motors will require larger casting cores, a great need has risen for improved techniques in core fabrication, both for reasons of cost and to improve core quality. Thus collapsible or segmented cores have been considered in the light of future requirements for the larger solid propellant rocket motors.

Such cores, after the casting operation, could be collapsed and withdrawn from the open aft end of a motor case (which in most instances is of smaller diameter than the main body of the motor case), or they could be fabricated or cast from a combustible material to be consumed during the operation of the solid propellant rocket motor. There are many other types of cores that by their inherent structure could be withdrawn through the open aft end of the motor case and such cores have been considered; however, the present invention has been developed to produce segmented cores that may be withdrawn from the open aft end of a motor case or consumed during the operation of the solid propellant rocket.

An important object of this invention, therefore, is to provide an interlocking multi-pieced segmented core that, after it has been dismantled into a plurality of segments, can be easily inserted into or withdrawn from a motor case that has a narrow open aft end.

Such a core will permit the nozzle joint for a solid propellant rocket motor to be formed at the area of the motor case, that will be at the approximate point of zero longitudinal stress when the solid propellant rocket motor is at operating pressure.

The use of such a core will also enable the loading density of the solid propellant rocket motor to be increased, since it will permit the solid propellant grain to be terminated more closely to the nozzle throat, near the aft end of the motor.

This type of core also has a decided advantage over a large rigid core that must be integrally inserted into the motor case, since the proper location of the nozzle closure joint is not possible in such a core structure.

Another important object of this invention is to provide a core that is considerably lighter and less expensive to manufacture than a solid core, and such advantages are of great importance in casting large solid propellant rocket motors.

With the above and other objects and advantages in view, the invention consists of the novel details of construction, arrangement and combination of parts more fully hereinatfer described, claimed and illustrated in the accompanying drawings in which:

Figure 1:
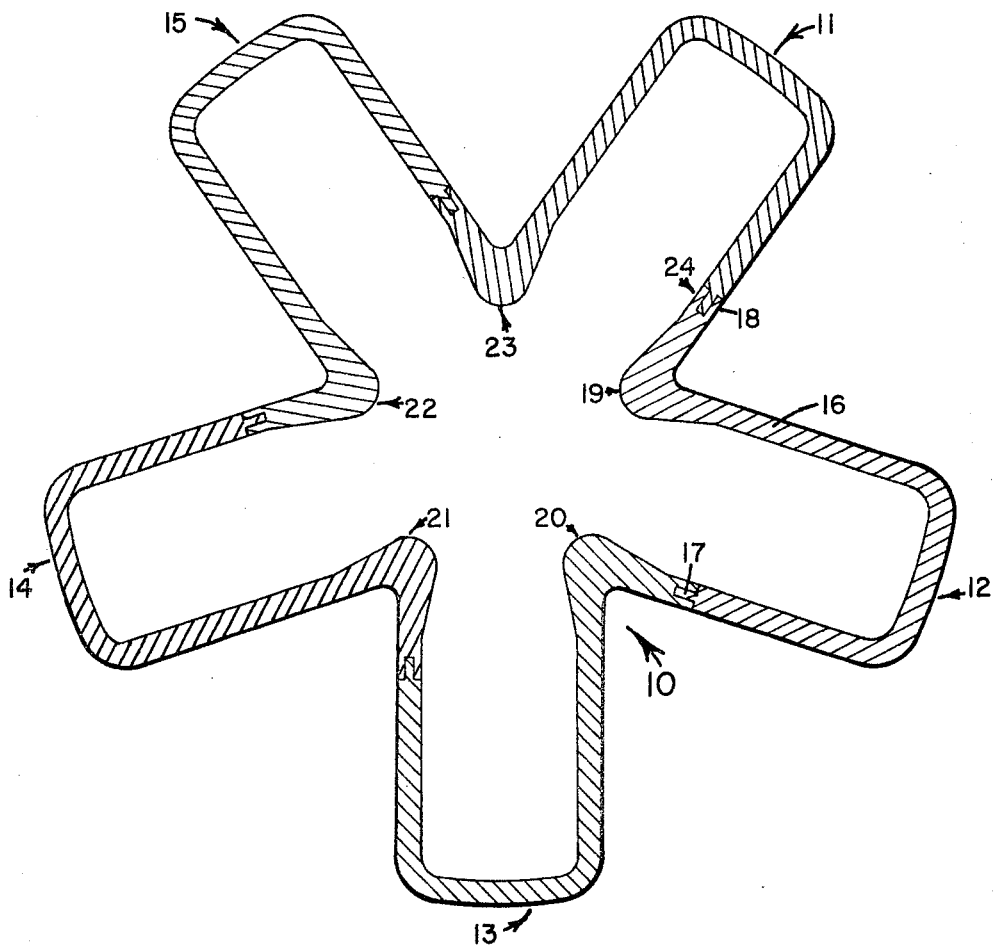
FIGURE 1 is a cross-sectional view of one form of segmented core embodying the invention.

Referring more in detail to the drawings wherein like parts are designated by like reference numerals, the reference numeral 10 in FIGURE 1 is used to designate one form of segmented core embodying the invention.

The core 10 in this instance is of the popular star formation that is used in the majority of instances for casting the central cavity in solid propellant grains for solid propellant rocket motors.

The core 10 includes five outer star points, 11 to 15 inclusive, but it is to be understood that many variations of designs can be used when such a change in design is desired to change the burning rate of the solid propellant grain.

The core 10 consists of five similarly shaped segments 16 which are of substantially U-shaped formation, and one end of each segment has a male dovetail formation 17, while the other end thereof has a female dovetail formation 18. Thus when the similarly shaped segments 16 are assembled as shown in FIGURE 1, a core of the desired shape and size is provided.

The core 10 also includes five inner star points 19 to 23 inclusive, and it will be seen that a dovetail joint 24 which includes the nesting of the male and female dovetail formations 17 and 18 respectively as shown in FIGURE 1. It will also be noted that there is a dovetail joint 24 adjacent each of the inner star points.

The segments 16 may be made from aluminum extrusions that are longitudinally tapered from the aft end thereof to the forward end thereof with the smallest projection thereof adapted to nest in the forward end of the motor case of the solid propellant rocket motor. The core 10 may be assembled by nesting the segments 16 as shown in FIGURE 1 before or after the core 10 is positioned in the motor case, prior to casting the solid propellant grain in the motor case.

In removing the core 10 from the motor case after the solid propellant grain has been cured, each segment may be removed separately, and since the core 10 is longitudinally tapered, such removal will be easily achieved.

The dovetailed joint 24 may be sealed as by welding bolting, or the like when the core 10 is assembled outside of the motor and the walls of the segments 16 may have sufficient flexibility so that, when pressure is applied to the interior of the core 10, the walls of the segments may expand to some degree to provide a cavity of larger size than would be obtained by the use of the core if it were not expandable. Thus, when the internal pressure is released from the core 10, the inherent normal formation of the segments 16 will cause the segments 16 to contract to permit easy removal thereof. In all instances, the core 10 will be coated with a suitable coating to prevent adherence of the solid propellant grain to the outer surface of the core 10.

The segments 16 can also be precast of a propellant composition or some similar resinous combustible composition and then bonded to the solid propellant grain, and will be consumed while the solid propellant rocket motor is in operation. Any suitable propellant or similar combustible material could be used, and if necessary, reinforcing agents such as chopped nylon fibers could be incorporated into either of the compositions. Combustible materials, such as magnesium, etc., could also be used, and the combustible core would thus contribute to the energy generated by the burning of the solid propellant grain.

Figure 2:
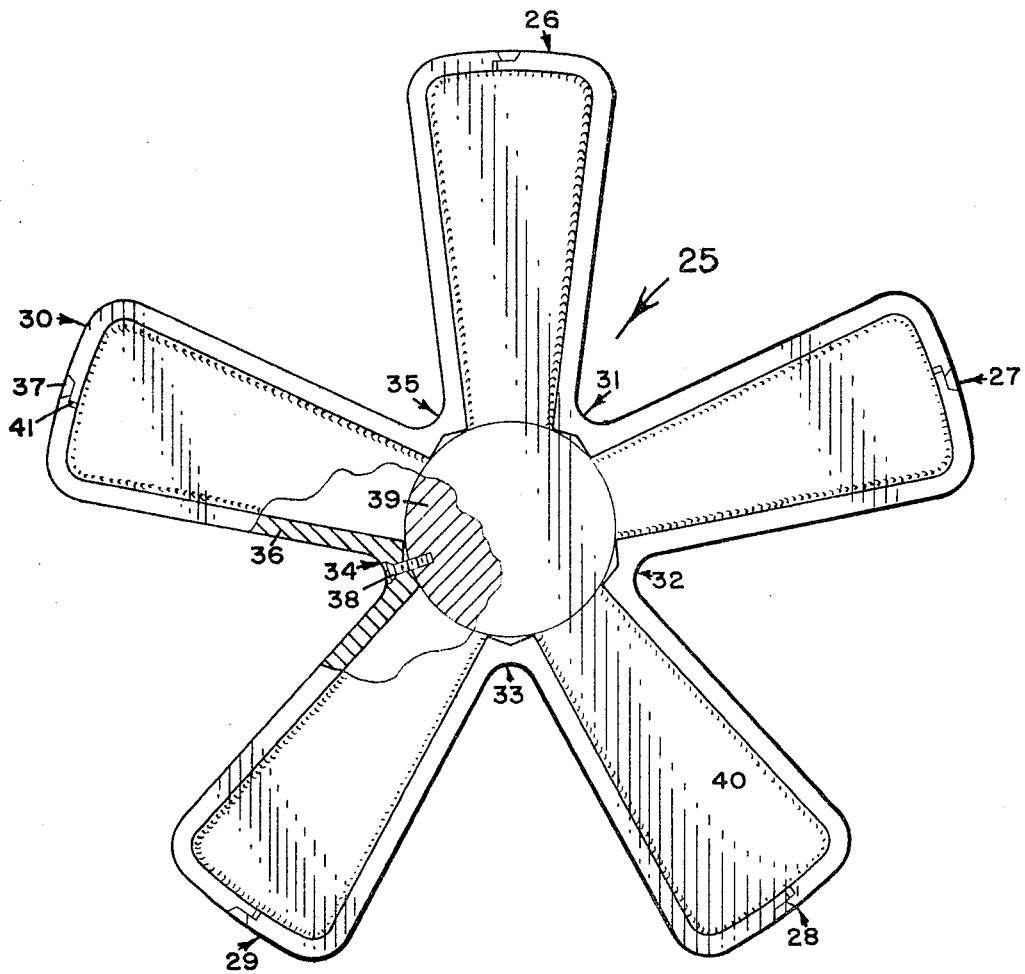
FIGURE 2 is an elevational end view partly broken away and partly in section of another from of segmented core embodying the invention.

In the form of the invention shown in FIGURE 2, the core 25 is also of star shape having outer star points 26 to 30 inclusive and inner star points 31 to 35 inclusive. The core 25 is constructed of substantially V-shaped segments such as shown at 36 and the ends thereof have overlapping joints 37 that are positioned centrally of each of the outer star points. The apexes of the segments 36 form the inner star points, and they are secured by a fastener 38 to a solid cylindrical centering member 39 such as shown in FIGURE 2. The fasteners 38 are made of "Teflon" or some similar material, which may be easily sheared, when the centering member 39 is slightly rotated. This permits the removal of the centering member 39 from a motor case and the subsequent removal of the segments 36 after the disassembly of the core 25. If, however, the core 25 is to be assembled prior to insertion into the motor case, metal screws may be used to firmly connect the segments 36 to the centering member 39. In either instance, bulk heads or covers 40 are secured to the segments 36 after the assembly of the core 25 in any suitable manner (depending on whether the core 25 is to be disassembled before the removal of the core 25 from the motor case) and the bulk heads or covers 40 close or seal the open aft end of the core 25. The core 25 is also longitudinally tapered to permit easy removal thereof from the solid propellant grain after it has been cured. A Teflon or similar seal 41 may be used between the joints 37. The segments 36 in this form of the invention may also be made of aluminum extrusions, but no provision is made for expanding the core 25 or precasting the core 25 of combustible material.

Figure 3:
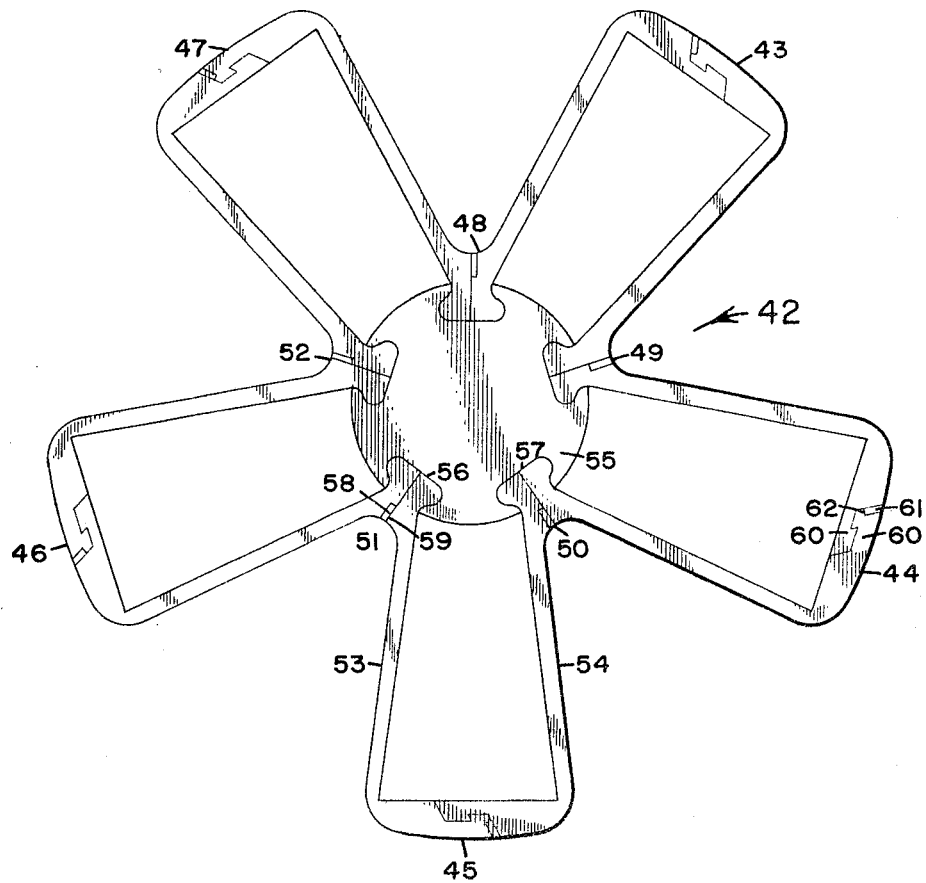
FIGURE 3 is an end view of still another form of segmented core embodying the invention.

In the form of the invention shown in FIGURE 3, the core 42 is also of star shape having outer star points 43 to 47 inclusive and inner star points 48 to 52 inclusive.

Core 42 is constructed of similarly shaped segments 53 and 54 respectively, and there are two segments for each star point. The core 42 also includes a solid cylindrical centering member 55 that is provided with a plurality of radially disposed cutouts 56 in the centering member 55. Teflon wedges 58 positioned in cutouts 59 provided in the inner ends 57 of the segment 54 serve to retain and seal the inner ends 57 in the cutouts 56 in the centering member 55. The segments 53 and 54 have outer ends 60 that are in interlocking engagement with each other, as shown in FIGURE 3, and a Teflon wedge 61 positioned in a cutout 62 in the segment 53 serves to retain and seal the outer ends 60 of the segments 52 and 54 in fixed relation to each other. The segments 53 and 54 may also be formed from aluminum by extrusion and the core 42 is susceptible of being collapsed for removal from the cavity formed in the solid propellant grain.

The segments 53 and 54 are inserted separately through the open aft end of a motor case and by inserting the segments at various angles in relation to each other and to the centering member 55 the core 42 may be assembled as shown in FIGURE 3.

The casting of the propellant grain in a rocket motor case is one of the most important techniques in the production of a solid propellant rocket motor, and the formation of the central cavity therein becomes a serious problem as the size of the rocket motor case increases. The present invention was developed therefore to provide a core for forming the cavity in the propellant grain that would not of itself because of its dead weight provide a serious handicap as the size of the rocket motor case increased.

Thus by forming the core of segments of various sizes and shapes as previously described, a great advance has been made in the field.

When the diameter of the aft opening of the rocket motor case is smaller than the overall diameter of the rocket motor case, the insertion of the core into the rocket motor case becomes a serious problem.

Each of the segments are thus of a size to enter the aft opening of the rocket motor case, and the easy assembly of the core may be handled from the outside of the rocket motor case or as the size of the rocket motor case increases it may be accomplished by men inside the rocket motor case.

It is believed also that the manner of use of the various forms of the invention as well as their manner of construction will be apparent to those skilled in the art, and it is also to be understood that changes in the minor detail of construction arrangement and combination of parts may be resorted to provided they fall within the spirit of the invention and the scope of the appended claims.

Having thus described the invention what is claimed as new and desired to be secured by Letters Patent is:

1. In a segmented core, a plurality of preformed sections that are adapted to be assembled into a unit of predetermined configuration for creating a cavity of preformed configuration in a cast solid grain for a solid propellant rocket motor, a rigid centering member extending longitudinally of said core and said cavity, said centering member having a plurality of radially disposed bores therein, said sections having openings therein that are to be alined with the bores in said centering member, fastening means extended through the openings in said sections into the bores in said centering member, whereby said sections are retained in rigid relation to said centering member, said sections having inter-mating ends so that said sections are retained in fixed relation to each other, and wherein said fastening means are of a material so that they may be easily sheared when said centering member is rotated.

2. In a segmented core, a plurality of preformed sections that are adapted to be assembled into a unit of predetermined configuration for creating a cavity of preformed configuration in a cast solid propellant grain for a solid propellant rocket motor, a rigid centering member extending longitudinally of said core and said cavity, said centering member having a plurality of radially disposed cutouts, and the inner ends of said sections are to be positioned in said cutouts to detachably connect said sections directly to said centering member, the outer ends of said sections being in interlocking engagement with each other and wedge members coacting with the inner and outer ends of said sections to retain said sections in rigid relation to said centering member and with each other.

References Cited by the Examiner

UNITED STATES PATENTS

| | | |
|---|---|---|
| 626,088 | 5/1899 | Paine et al. |
| 795,518 | 7/1905 | Lamp _____ 25—128 |
| 955,235 | 4/1910 | Wellman _____ 25—128 |
| 979,958 | 12/1910 | Jackson _____ 25—128 |
| 1,236,556 | 8/1917 | Goldsborough. |
| 1,238,384 | 8/1917 | Blumenthal _____ 25—128 |
| 1,373,877 | 4/1921 | Fifield _____ 25—128 |
| 1,996,678 | 4/1935 | Leggat et al. _____ 25—128 |
| 2,170,188 | 8/1939 | Cobi _____ 25—128 |
| 2,315,634 | 4/1943 | McCall _____ 25—128 |
| 2,589,177 | 3/1952 | Wilhelm et al. |
| 2,750,629 | 1/1956 | Baudou _____ 25—128 XR |
| 2,865,079 | 12/1958 | Marchioli et al. _____ 25—128 |
| 2,952,876 | 9/1960 | Miles. |
| 2,970,343 | 2/1961 | Johnson et al. _____ 18—45 |
| 3,011,363 | 9/1961 | Thibodaux et al. |
| 3,067,467 | 12/1962 | Yanush _____ 25—128 XR |
| 3,083,409 | 4/1963 | Crawford et al. _____ 18—45 |
| 3,136,831 | 6/1964 | Zinn _____ 18—45 XR |

FOREIGN PATENTS 263,489    8/1927    Great Britain.

J. SPENCER OVERHOLSER, *Primary Examiner.*

WILLIAM J. STEPHENSON, J. H. FLINT,
*Assistant Examiners.*